United States Patent
Xu et al.

(10) Patent No.: US 12,555,850 B2
(45) Date of Patent: Feb. 17, 2026

(54) EXPLOSION-PROOF SHEET, TOP COVER ASSEMBLY OF SECONDARY BATTERY, AND SECONDARY BATTERY

(71) Applicant: Hithium Tech HK Limited, Kowloon (HK)

(72) Inventors: Weidong Xu, Fujian (CN); Ziqi Yi, Fujian (CN); Zuyu Wu, Fujian (CN); Nan Zhang, Fujian (CN); Yang Tang, Fujian (CN)

(73) Assignee: HITHIUM TECH HK LIMITED, Kowloon (HK)

( * ) Notice: Subject to any disclaimer, the term of this patent is extended or adjusted under 35 U.S.C. 154(b) by 772 days.

(21) Appl. No.: 17/950,500

(22) Filed: Sep. 22, 2022

(65) Prior Publication Data

US 2023/0113132 A1   Apr. 13, 2023

(30) Foreign Application Priority Data

Oct. 12, 2021 (CN) .......................... 202122458310.6

(51) Int. Cl.
*H01M 50/143* (2021.01)
*H01M 50/147* (2021.01)
*H01M 50/578* (2021.01)

(52) U.S. Cl.
CPC ....... *H01M 50/143* (2021.01); *H01M 50/147* (2021.01); *H01M 50/578* (2021.01)

(58) Field of Classification Search
CPC . H01M 50/143; H01M 50/147; H01M 50/578
See application file for complete search history.

(56) References Cited

U.S. PATENT DOCUMENTS 6,132,900 A * 10/2000 Yoshizawa .......... H01M 50/183
429/57

FOREIGN PATENT DOCUMENTS

| CN | 2701082 Y | * | 5/2005 | |
|---|---|---|---|---|
| CN | 101567432 A | * | 10/2009 | |
| CN | 212323152 U | | 1/2021 | |
| CN | 112382826 A | * | 2/2021 | ........ H01M 50/3425 |
| EP | 4167334 A1 | | 4/2023 | |
| WO | 2021187089 A1 | | 9/2021 | |

OTHER PUBLICATIONS

CN-101567432-A machine translation (Year: 2009).*
CN-2701082-Y machine translation (Year: 2005).*

(Continued)

*Primary Examiner* — James M Erwin
*Assistant Examiner* — Sarah Arimintia Applegate
(74) *Attorney, Agent, or Firm* — Scully, Scott, Murphy & Presser, P.C.

(57) ABSTRACT

An explosion-proof sheet, a top cover assembly of a secondary battery, and a secondary battery are provided. The explosion-proof sheet has a pressure release portion arranged oppositely to the explosion-proof hole, a fixing portion surrounding the pressure release portion and connected to the top cover, a connecting portion located between the pressure release portion and the fixing portion for connecting the pressure release portion to the fixing portion. A thickness of a part of the connecting portion is greater than a thickness of the remaining part of the connecting portion.

14 Claims, 5 Drawing Sheets

(56) References Cited

OTHER PUBLICATIONS

CN-112382826-A machine translation (Year: 2021).*
Extended European Search Report dated Feb. 23, 2023 received in European Patent Application No. EP 22197276.3.
Notification of Granting a New Type of Patent Right for Practical Use dated Feb. 16, 2022 received in Chinese Patent Application No. CN 202122458310.6.
Office Action dated Jul. 11, 2023 received in European Patent Application No. EP 22197276.3.

* cited by examiner

EXPLOSION-PROOF SHEET, TOP COVER ASSEMBLY OF SECONDARY BATTERY, AND SECONDARY BATTERY

CROSS-REFERENCE TO RELATED APPLICATION

This application claims priority to and benefits of Chinese Patent Application No. 202122458310.6, filed on Oct. 12, 2021, the entire contents of which are hereby incorporated by reference for all purposes. No new matter has been introduced.

TECHNICAL FIELD

The present application relates to the technical field of batteries, and in particular to an explosion-proof sheet, a top cover assembly of a secondary battery, and a secondary battery.

BACKGROUND

A secondary battery, also called a rechargeable battery or a storage battery, refers to a battery reusable after discharging by a way, in which an active substance for the secondary battery can be re-activated by charging.

The secondary battery generally includes a casing, a cell and a top cover assembly. One side of the casing has an opening, the cell is arranged in the casing, and the top cover assembly is covered on the opening of the casing. The top cover assembly is provided with an explosion-proof hole, and the explosion-proof hole is covered with an explosion-proof sheet. When a battery is used in an overcharged, over-discharged, short-circuited or harsh environment (such as, when a battery is used in a high temperature, high humidity, high pressure or low pressure environment), a large amount of gas will be generated inside the battery, and the temperature of the battery will rise sharply. As a result, the internal pressure of the battery increases, and when the internal pressure of the battery reaches a threshold, the gas will rupture the explosion-proof sheet to release the pressure so as to ensure the safety of the battery.

However, when the explosion-proof sheet is ruptured, the explosion-proof sheet is likely to be detached from the top cover as a whole, which may cause injury to users or other surrounding components.

SUMMARY

The present application discloses an explosion-proof sheet, a top cover assembly of a secondary battery, and a secondary battery. When the pressure is released by the explosion-proof sheet, the explosion-proof sheet departing from the top cover integrally may be avoided during pressure release, and thus the usage safety of the battery may be improved.

In a first aspect, the present application discloses an explosion-proof sheet of a secondary battery. The secondary battery includes a top cover provided with an explosion-proof hole. The explosion-proof sheet is fitted on the top cover to close the explosion-proof hole, and the explosion-proof sheet includes:

a pressure release portion, arranged oppositely with the explosion-proof hole:
a fixing portion, surrounding the pressure release portion and connected to the top cover:
a connecting portion, located between the pressure release portion and the fixing portion, and configured to connect the pressure release portion and the fixing portion; and
a thickness of a part of the connecting portion is greater than a thickness of the remaining part of the connecting portion.

When the explosion-proof sheet is connected to the top cover, the fixing portion of the explosion-proof sheet will have a sealed connection with an edge of the explosion-proof hole, and the fixing portion is arranged around the pressure release portion. That is, the pressure release portion is located inside the fixing portion, so the pressure release portion is arranged oppositely to the explosion-proof hole. At this time, since the pressure release portion and the fixing portion are connected by the connecting portion, and the thickness of the part of the connecting portion is greater than the thickness of the remaining part, when a pressure inside the battery reaches a threshold, a part with a smaller thickness of the connecting portion will crack first, and a part with a greater thickness of the connecting portion will remain connected. Thus a part where the pressure release portion joins the part with a smaller thickness is separated with the fixing portion and a vent is formed, so that gas inside the battery may be discharged from the vent, and the part where the pressure release portion joins the part with a greater thickness may still remain connected with the fixing portion. Therefore, the explosion-proof sheet departing from the top cover integrally during pressure release may be avoided, thereby the usage safety of the battery may be improved.

Further, the connecting portion includes at least one strengthened region and at least one weakened region. A thickness of the strengthened region is greater than a thickness of the weakened region, and a length of the strengthened region accounts for ⅙ to ⅓ of a total length of the connecting portion.

Therefore, if the length of the strengthened region is overly long, explosion of the explosion-proof sheet may be delayed, and if the length of the strengthened region is overly short, the pressure release portion may be blown up integrally when the explosion-proof sheet is exploded, thereby the use safety of the battery may be further improved.

Further, the connecting portion has a thickness $d_1$, the pressure release portion has a thickness $d_2$, and the fixing portion has a thickness $d_3$, $0.3 \leq d_1/d_2 \leq 0.4$, $0.5 \leq d_2/d_3 \leq 0.6$, and when an air pressure inside the secondary battery is greater than or equal to a threshold, the explosion-proof sheet may be cracked in the connecting portion. The air pressure P inside the secondary battery and the thickness $d_1$ of the connecting portion satisfy the following relationship: $2.7 < P/d_1 \leq 7.3$, where the unit of P is MPa, and the unit of $d_1$ is millimeter.

Therefore, when a thickness of each part of the explosion-proof sheet and the air pressure P inside the secondary battery satisfy the above relationship, it can be ensured that the explosion-proof sheet can be opened in time, thereby invalidation of the explosion-proof sheet may be avoided.

Further, $d_1$: $d_2$: $d_3 = 11:30:55$, the $P/d_1 = 5.5$.

As a result, the above proportional relationship can more accurately ensure that the explosion-proof sheet explodes successfully when the air pressure inside the battery reaches the threshold.

Further, the connecting portion is an annular groove, and a thickness the connecting portion at a of groove bottom of the weakened region is smaller than a thickness of the connecting portion at a groove bottom of the strengthened region.

When the pressure inside the battery is much greater than the threshold, a pressure release port formed by cracking of the weakened region alone cannot satisfy pressure release. In order to prevent battery explosion causing more damage to a user, in the present embodiment, the connecting portion is set as an annular groove, and the thickness of the connecting portion at the groove bottom of the strengthened region is larger than the thickness of the connecting portion at the groove bottom of the weakened region. Hence, the weakened region and the strengthened region will be cracked in sequence, and then the pressure release portion will be separated from the top cover, so that pressure release of the battery can be performed quickly and greater danger is avoided.

Further, the thickness of the connecting portion at the groove bottom of the weakened region is A, and the thickness of the connecting portion at the groove bottom of the strengthened region is B. A and B satisfy the following relationship: $0.65 \leq A/B \leq 0.75$.

By setting the ratio of the thickness of the connecting portion at the groove bottom of the weakened region to the thickness of the connecting portion at the groove bottom of the strengthened region to 0.65~0.75, cracking in the strengthened region can be effectively avoided when the pressure inside the battery reaches the threshold.

Further, $A:B=11/15$.

In this way, high structural strength of the battery during normal use may be ensured, and cracks in the weakened region during normal use of the battery may be avoided. It can also be ensured that when the pressure inside the battery reaches the threshold, the strengthened region has better structural strength, and the strengthened region can be prevented from cracking and causing the pressure release portion being separated from the top cover.

Further, a cross-sectional shape of the annular groove is an inverted trapezoidal structure, and the angle α between a side wall and the groove bottom of the annular groove satisfies: $90° < \alpha \leq 120°$.

Therefore, when the annular groove is deformed and cracked, side walls on both sides of a notch of the annular groove are less likely to interfere, and the pressure release portion will be more smoothly partially separated from the fixing portion for pressure release.

Further, the annular groove has a stadium-shaped structure, and the stadium-shaped structure includes two straight grooves and two arc-shaped grooves, the two straight grooves are parallel to each other, and the two arc-shaped grooves are respectively connected to two ends of the two straight grooves. There are two strengthened regions, and the two strengthened regions are respectively located at the two straight grooves.

When the pressure inside the battery reaches the threshold, the weakened regions located at the two arc-shaped grooves may crack, while both of the strengthened regions located at the two straight grooves may not crack. Therefore, vents can be formed on both sides of the straight sections, and the gas in the battery can be discharged from two different vents, so that pressure discharge of the battery is more balanced during pressure release, and the usage safety of the battery is further improved.

Further, a liquid injection hole is also opened on the top cover, and the liquid injection hole is arranged close to the straight groove.

Therefore, when the pressure is released by the explosion-proof sheet, substance inside the battery may be ejected from the explosion-proof hole along with the cracking of the explosion-proof sheet. Since the strengthened region is located at the straight groove, a part of the pressure release portion located at the straight groove may not be cracked, thereby preventing the substance inside the battery from entering the liquid injection hole.

In a second aspect, the present application further discloses a top cover assembly, including:

a top cover, provided with an explosion-proof hole:

the explosion-proof sheet according to the first aspect, where a fixing portion of the explosion-proof sheet has a sealed connection with an edge of the explosion-proof hole.

Because the fixing portion of the explosion-proof sheet has a sealed connection with the edge of the explosion-proof hole on the top cover, and the pressure release portion may not be completely separated from the fixing portion when the pressure is released by the explosion-proof sheet. Therefore, the pressure release portion may not be completely separated from the top cover, thereby usage safety of the top cover assembly is improved.

In a third aspect, the present application further discloses a secondary battery, including: the top cover assembly according to the second aspect.

For example, the top cover assembly is arranged on an opening of a casing of the battery. Since the pressure release portion of the explosion-proof sheet will not be completely separated from the top cover when the pressure is released by the top cover assembly, the secondary battery has good usage safety.

BRIEF DESCRIPTION OF THE DRAWINGS

In order to illustrate the technical solutions of the embodiments of the present application in a clearer manner, the drawings desired for describing the embodiments of the present application will be described hereinafter briefly. Obviously, the following drawings merely relate to some embodiments of the present application, and based on these drawings, a person skilled in the art may obtain the other drawings without any creative effort.

REFERENCE NUMERALS

Figure 1:
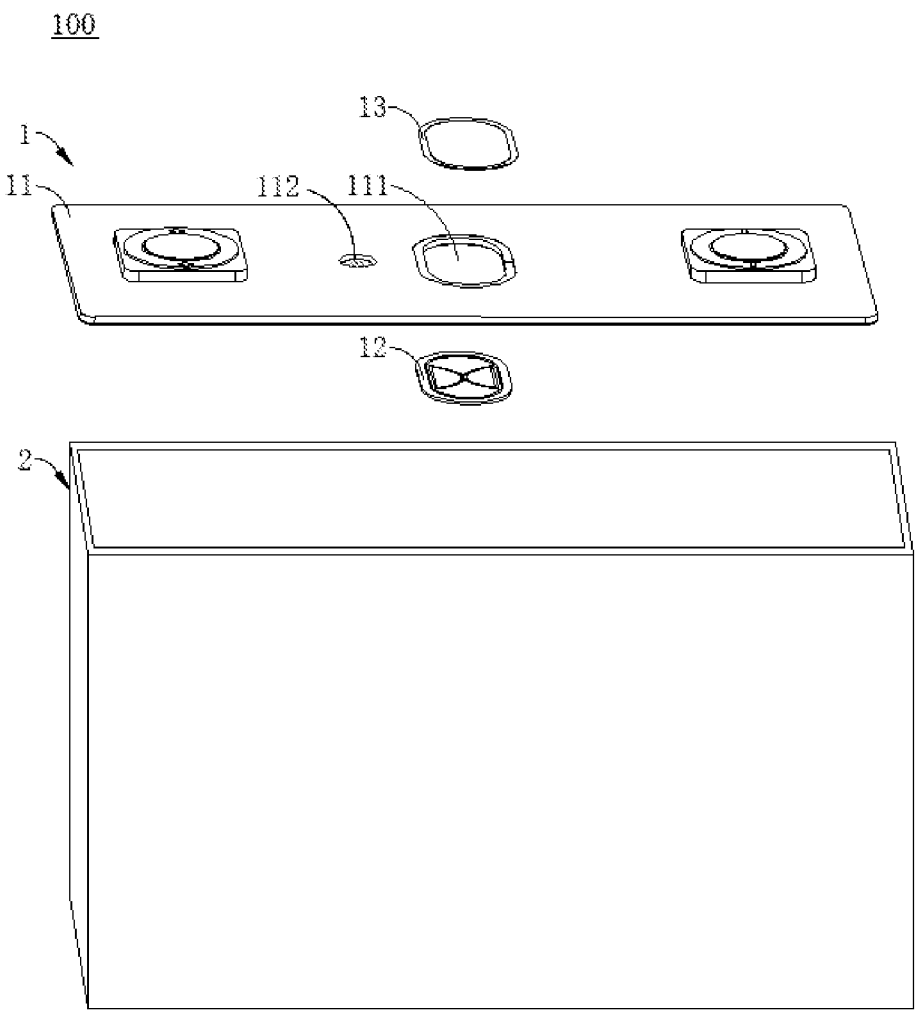
FIG. 1 is an exploded view of a secondary battery in an embodiment of the present application.

100—secondary battery, 1—top cover assembly, 11—top cover, 111—explosion-proof hole, 112—liquid injection hole, 113—bottom surface, 114—top surface, 115—sink, 12—explosion-proof sheet, 121—fixing portion, 122—pressure release portion, 123—connecting portion, 1231—weakened region, 1232—strengthened region, 1233—notch of annular groove, 1234—groove bottom of annular groove, 1235—side wall, 1236—straight groove, 1237—arc-shaped groove, 124—front surface, 125—back surface, 13—protective sheet, 2—casing.

DETAILED DESCRIPTION

Hereinafter, the technical solutions in the embodiments of the present application will be described clearly and thoroughly in conjunction with the drawings in the embodiments of the present application. Obviously, the described embodiments are merely some of the embodiments of the present application, but not all of the embodiments. Based on the embodiments in the present application, all other embodiments obtained by a person of ordinary skill in the art without creative efforts should fall within the protection scope of the present application.

In the present application, the direction or positional relationship indicated by terms "on/above", "under/below", "left", "right", "front", "back", "top", "bottom", "inside", "outside", "in the middle of", "vertical", "horizontal", "lateral", "longitudinal", etc. is the direction or positional relationship based on that shown in the drawings. These terms are primarily intended to better describe the present application and its embodiments and are not used to define that the indicated device, element or component must has a particular direction, or be constructed and operated in a particular direction.

Moreover, some of the terms may be used to indicate other meanings in addition to the direction or positional relationship, for example, the term "on/above" may also be used to indicate a certain dependency or connection relationship in some cases. For those of ordinary skill in the art, the specific meanings of the terms in the present application may be understood according to specific situations.

In addition, the terms "install", "arrange", "provide", "provided with", "connect" and "couple" should be understood broadly. For example, it can be a fixed connection, a detachable connection, an integral structure, a mechanical connection, an electrical connection, a direct connection, an indirect connection through an intermediate medium, or a communication between two devices, elements or components. For those of ordinary skill in the art, the specific meanings of the above terms in the present application can be understood according to specific situations.

In addition, the terms "first", "second", etc., are used primarily to distinguish different devices, elements or components (the specific type and construction may be the same or different) and are not used to indicate or imply the relative importance or quantity of the indicated device, element or component. Terms like "multiple"/"a plurality of" refer to the number of two or more than two, except for clear and particular restriction.

Before explaining the technical solutions of the present application, the application scenarios involved in the embodiments of the present application are explained.

During the use of the battery, when the battery is used in an overcharged, over-discharged, short-circuited or harsh environment (when the battery is used in a high temperature, high humidity, high pressure or low pressure environment), a large amount of gas will be generated inside the battery and the temperature of the battery will also rise sharply, resulting in an increase in the internal pressure of the battery, which will cause a certain danger to the user. In the related art, in order to ensure safety of the battery, an explosion-proof hole is generally opened on a top cover of the battery, and an explosion-proof sheet is covered at the explosion-proof hole. When the pressure inside the battery reaches a threshold, the gas will rupture the explosion-proof sheet for pressure release to ensure the safety of the battery. However, when the pressure inside the battery rises sharply, the explosion-proof sheet is likely to be separated from the top cover as a whole, and there are safety problems for other components and users.

Based on this, the present application provides an explosion-proof sheet, a top cover assembly and a battery to solve the above problems.

The technical solutions of the present application will be further described below with reference to exemplary embodiments and accompanying drawings.

Referring to FIG. 1. FIG. 1 is an exploded view of a battery in an embodiment of the present application. Among them, the present application provides a secondary battery 100. The secondary battery 100 includes a top cover assembly 1 and a casing 2, the top cover assembly 1 is covered on an opening of the casing 2, so that the top cover assembly 1 and the casing 2 may be enclosed to form a sealed space, and a cell structure (not shown in the figure) of the secondary battery 100 may be accommodated in the space.

Figure 2:
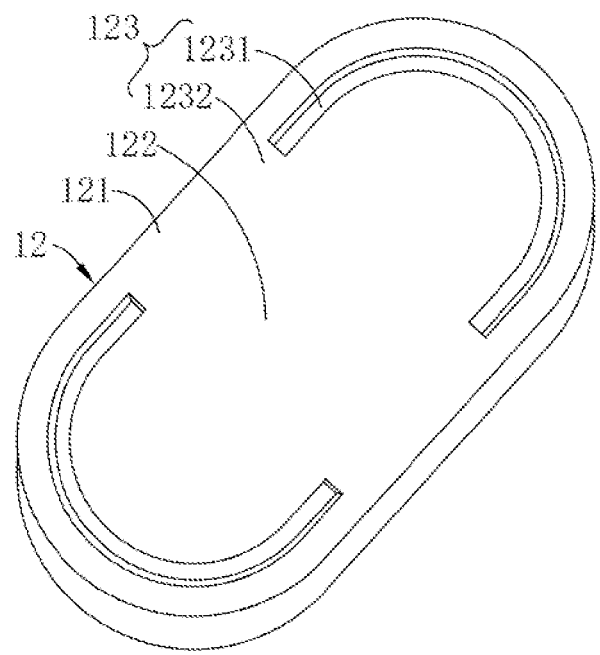
FIG. 2 is a schematic view of an explosion-proof sheet in an embodiment of the present application (a strengthening rib on the pressure release portion is omitted)

For example, referring to FIG. 1 and FIG. 2, the top cover assembly 1 includes a top cover 11 and an explosion-proof sheet 12. The top cover 11 is provided with an explosion-proof hole 111, and the fixing portion 121 of the explosion-proof sheet 12 has a sealed connection with an edge of an end face of the explosion-proof hole 111. Therefore, when the secondary battery 100 is in normal use, the explosion-proof sheet 12 can seal the explosion-proof hole 111 to prevent interior of the secondary battery 100 from being affected by the outside. At the same time, due to an improvement of the explosion-proof sheet 12 in the present application, when a pressure inside the secondary battery 100 reaches a threshold, the explosion-proof sheet 12 will be partially separated from the top cover 11 to perform pressure release, and it is different for the explosion-proof sheet 12 to be separated from the top cover assembly 1 as a whole. Therefore, the usage safety of the secondary battery 100 is improved and safety of the user is effectively ensured.

In addition, the top cover assembly 1 may further include a protective sheet 13, which is arranged on an outer side of the top cover 11 and covers the explosion-proof hole 111 and the explosion-proof sheet 12. Therefore, it can prevent the user from accidentally touching the explosion-proof sheet 12 and causing the explosion-proof sheet 12 to deform, and prevent foreign objects from falling on the surface of the explosion-proof sheet and causing the explosion-proof sheet invalidation. In addition, when the explosion-proof sheet 12 is partially separated from the top cover 11 for pressure release, the protective sheet 13 can buffer deformation of the explosion-proof sheet 12, thereby improving safety of the pressure release.

Figure 3:
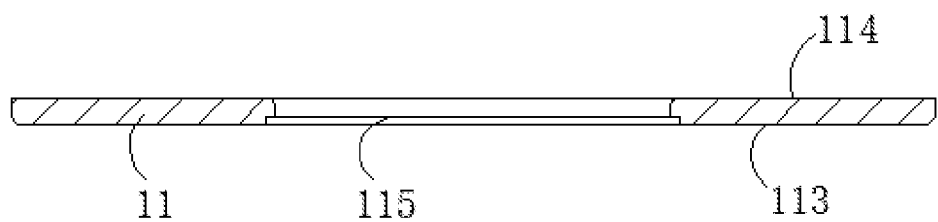
FIG. 3 is a schematic cross-sectional view of a top cover at the explosion-proof hole in an embodiment of the present application.

It should be noted that, the sealed connection of the fixing portion 121 of the explosion-proof sheet 12 and the edge of the explosion-proof hole 111 may be in various ways, such as snap connection, bonding or welding, etc. In the present application, the explosion-proof sheet 12 is fixed onto the top cover 11 by welding, thereby sealing of the explosion-proof sheet 12 and the top cover 11 is ensured, and problems such as liquid leakage and air leakage are avoided. Preferably, as shown in FIG. 3, in the present application, one side of a bottom surface 113 of the top cover 11 is recessed toward a top surface 114 to form a sink 115. The explosion-proof sheet 12 is embedded in the sink 115, and the fixing portion 121 of the explosion-proof sheet 12 is welded with the bottom of the sink. A depth of the sink is approximately the same as a thickness of the explosion-proof sheet. In this way, when the fixing portion 121 of the explosion-proof sheet 12 is attached to the surface of the sink, the explosion-proof sheet 12 and the bottom surface of the top cover are substantially on the same plane, thereby preventing the explosion-proof sheet 12 from protruding from the bottom surface of the top cover 11 and reducing the internal space of the secondary battery occupied by of the explosion-proof sheet 12. So that an overall volume of the battery may be reduced, and the explosion-proof sheet 12 may also be prevented from interfering with other components and affecting normal creep of electrolyte, thereby reliability of electrochemical performance of the battery may be ensured. That is, the assembling accuracy of the explosion-proof sheet 12 and the top cover 11 is crucial to the performance and safety of the secondary battery 100.

Next, the improved explosion-proof sheet 12 in the present application will be explained in detail below. Referring to FIGS. 2 to 6. For example, the explosion-proof sheet 12 includes a pressure release portion 122 and a fixing portion 121 disposed around the pressure release portion 122. The pressure release portion 122 and the fixing portion 121 are connected by a connecting portion 123, and the connecting portion 123 includes a weakened region 1231 and a strengthened region 1232. A wall thickness of the weakened region 1231 is smaller than a wall thickness of the strengthened region 1232.

Among them, when the explosion-proof sheet 12 is connected to the top cover 11, the fixing portion 121 of the explosion-proof sheet 12 may have a sealed connection with a hole wall surface of the explosion-proof hole 111, and the fixing portion 121 is arranged around the pressure release portion 122. That is, the pressure release portion 122 is located inside the fixing portion 121, so the pressure release portion 122 is arranged oppositely to the explosion-proof hole 111. At this time, the pressure release portion 122 and the fixing portion 121 are connected by the connecting portion 123, the connecting portion 123 includes a weakened region 1231 and a strengthened region 1232, and the wall thickness of the weakened region 1231 is smaller than the wall thickness of the strengthened region 1232. Therefore, when a pressure inside the secondary battery 100 reaches a threshold, the weakened region 1231 of the connecting portion 123 cracks first, and the strengthened region 1232 of the connecting portion remains connected. Thus a part where the pressure release portion 122 joins the weakened region 1231 is separated with the fixing portion 121 and a vent (not shown in the figures) is formed, so that gas inside the battery can be discharged from the vent, and the part where the pressure release portion 122 joins the strengthened region 1232 may still remain connected with the fixing portion 121. It can be seen that when the explosion-proof sheet 12 performs pressure release, the fixing portion 121 is still be connected to the edge of the explosion-proof hole 111, and a part where the pressure release portion 122 joins the weakened region 1231 is separated from the fixing portion 121 and the pressure is released. The part where the pressure release portion 122 joins the strengthened region 1232 may still remain connected, so as to prevent the explosion-proof sheet 12 from being separated from the top cover 11 as a whole when the pressure is released, thereby the usage safety of the secondary battery 100 is improved.

It should be noted that, in order to further improve the usage safety of the secondary battery 100, in the embodiment of the present application, the explosion-proof sheet 12 can be arranged on a surface of the top cover 11 close to the casing 2, that is, the explosion-proof sheet 12 is arranged on a lower surface of the top cover 11 in FIG. 1. When the secondary battery 100 performs pressure release, the gas inside the secondary battery 100 is flushed out through the explosion-proof hole 111, and the gas inside the secondary battery 100 is flushed out in a direction from the lower surface of the top cover 11 to an upper surface of the top cover 11. At this time, since the explosion-proof sheet 12 is arranged on the lower surface of the top cover 11, and the fixing portion 121 of the explosion-proof sheet 12 is connected to the edge of the explosion-proof hole 111, the fixing portion 121 of the explosion-proof sheet 12 may be stably connected with the top cover 11 to prevent the fixing portion 121 of the explosion-proof sheet 12 from being separated from the top cover 11.

The length of the strengthened region 1232 needs to be selected in a suitable range. If the length of the strengthened region 1232 is overly long, explosion of the explosion-proof sheet 12 may be delayed. If the length of the strengthened region 1232 is overly short, the strength of the strengthened region 1232 may be insufficient, so that the pressure release portion 122 may be blown up integrally when the explosion-proof sheet 12 is exploded. Therefore, the length of the strengthened region 1232 can be set to account for ⅙ to ⅓ of a total length of the connecting portion 123. In this way, the explosion-proof sheet 12 can explode in time, and the pressure release portion 122 can be prevented from being blown up integrally, thereby the usage safety of the battery is further improved.

In the above embodiment, in order to ensure that when the gas pressure inside the secondary battery 100 is greater than or equal to a critical value P, the explosion-proof sheet 12 can be cracked in the connecting portion 123. The thickness d1 of the connecting portion 123, the thickness d2 of the pressure release portion 122, and the thickness d3 of the fixing portion 121 satisfy the following relationships: $0.3 \leq d1/d2 \leq 0.4$, $0.5 \leq d2/d3 \leq 0.6$, and the critical value P of the gas pressure inside the secondary battery 100 and the thickness d1 of the connecting portion 123 satisfy the following relationship: $2.7 < P/d1 \leq 7.3$, where the unit of P is MPa, and the unit of d1 is millimeter. In this way, it can be ensured that the explosion-proof sheet can be opened in time, thereby invalidation of the explosion-proof sheet may be avoided.

For example, $d1:d2:d3=11:30:55$, P: $d1=5.5$. For example, the thickness d1 of the connecting portion 123 may be 0.11 mm, the thickness d2 of the pressure release portion 122 may be 0.3 mm, and the thickness d3 of the fixing portion 121 may be 0.55 mm. Therefore, when the gas pressure P inside the secondary battery 100 is greater than or equal to 0.6 Mpa, the explosion-proof sheet 12 will start to perform pressure release. In this way, it can be more accurately ensured that the explosion-proof sheet 12 explodes successfully when the gas pressure inside the battery reaches the threshold.

Figure 4:
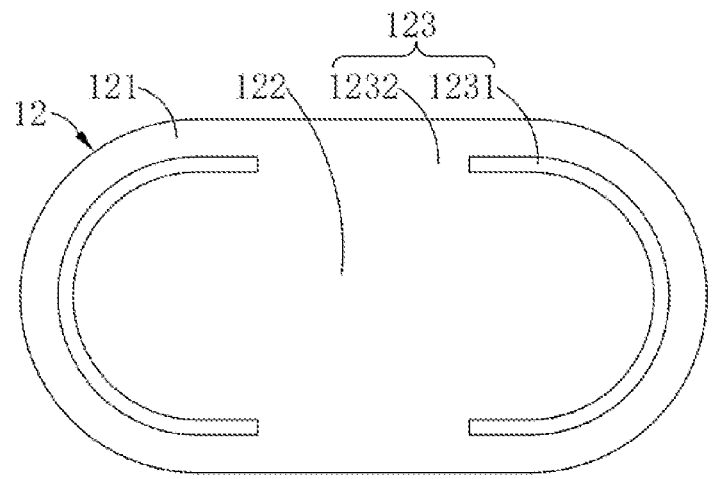
FIG. 4 is a top view of the explosion-proof sheet in FIG. 2.

In some embodiments, referring to FIG. 2 and FIG. 4, the weakened region 1231 forms a non-closed groove, and the wall thickness of the strengthened region 1232 is equal to the wall thickness of the explosion-proof sheet 12. Among them, when the weakened region 1231 forms a closed groove, since the weakened region 1231 is cracked during pressure release, the pressure release portion 122 inside the weakened region 1231 will be separated from the top cover 11, thereby causing danger to the user. In the present application, the weakened region 1231 forms a non-closed groove, so that after the weakened region 1231 is cracked, the part where the pressure release portion 122 joins the strengthened region 1232 will still be connected to the fixing portion 121, so that a danger to the user caused by the pressure release portion 122 being separated from the top cover 11 is avoided. At the same time, the wall thickness of the strengthened region 1232 is equal to the wall thickness of the explosion-proof sheet 12, so that the strengthened region 1232 can have a greater structural strength. Accordingly, the pressure release portion 122 connected with the strengthened region 1232 and the fixing portion 121 are stably connected together. This effectively prevents the pressure release portion 122 from being separated from the top cover 11, and the usage safety of the secondary battery 100 is effectively increased.

Figure 5:
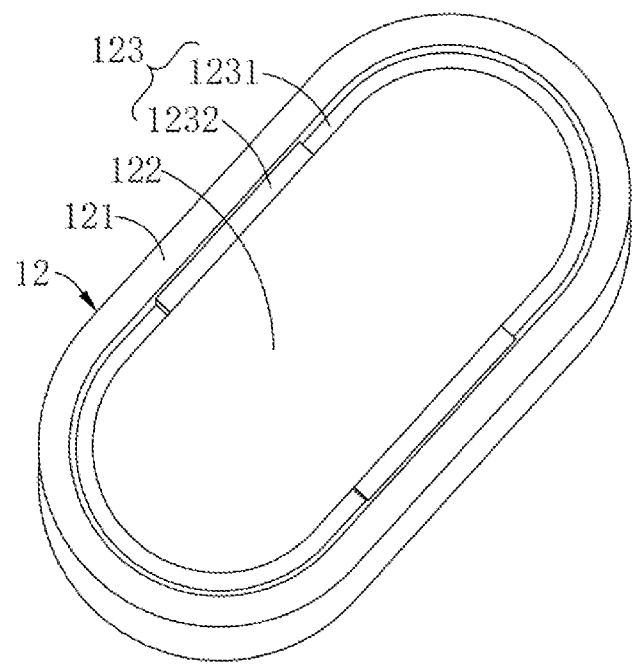
FIG. 5 is a schematic view of another explosion-proof sheet in an embodiment of the present application (a reinforcing rib on the pressure release portion is omitted)
Figure 6:
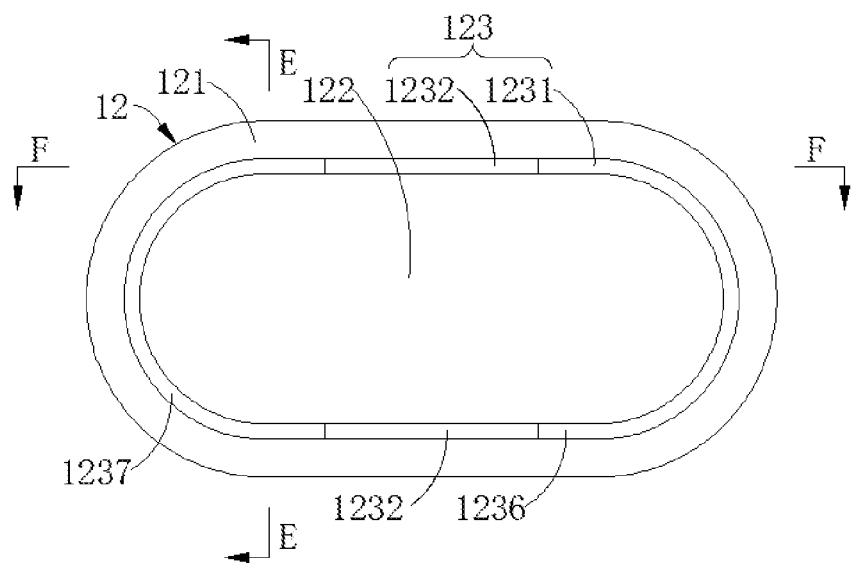
FIG. 6 is a top view of the explosion-proof sheet in FIG. 5.

In other embodiments, referring to FIGS. 5 and 6, the connecting portion 123 is an annular groove, and the thickness of the connecting portion at the groove bottom of the weakened region 1231 is smaller than the thickness of the connecting portion at the groove bottom of the strengthened region 1232.

Among them, when the pressure inside the secondary battery 100 reaches the threshold, the weakened region 1231 is cracked to make the pressure release portion 122 being partially separate from the fixing portion 121 for pressure release. However, when the pressure inside the secondary battery 100 is much greater than the threshold, that is, when the pressure release port formed by the cracking of the weakened region 1231 cannot satisfy the pressure release, the secondary battery 100 may explode at this time, thereby causing a greater danger to the user. Based on this, the connecting portion 123 in the embodiment of the present application is an annular groove, and the thickness of the connecting portion at the groove bottom of the strengthened region 1232 is greater than the thickness of the connecting portion at the groove bottom of the weakened region 1231. Therefore, when the pressure inside the secondary battery 100 reaches the threshold, the weakened region 1231 is cracked so that the pressure release portion 122 and the fixing portion 121 will be partially separated for pressure release, while the strengthened region 1232 will not be cracked so that the pressure release portion 122 may still be partially connected with the fixing portion 121 to prevent the pressure release portion 122 from being separated with the top cover 11 and causing a danger to the user. But when the pressure inside the secondary battery 100 is much greater than the threshold, the pressure release port formed by the cracking of the weakened region 1231 alone cannot satisfy the pressure release. In order to avoid the explosion of the secondary battery 100 causing more damage to the user, in the present embodiment, the connecting portion 123 is set as an annular groove, and the thickness of the connecting portion at the groove bottom of the strengthened region 1232 is greater than that of the weakened region 1231. As a result, the weakened region 1231 and the strengthened region 1232 are cracked in sequence, and then the pressure release portion 122 is separated from the top cover 11, so as to quickly perform pressure release of the secondary battery 100 and avoid greater danger.

In addition, the connecting portion 123 is set as an annular groove, that is, the wall thickness of the strengthened region 1232 is smaller than the thickness of the explosion-proof sheet 12, so that an overall thickness of the explosion-proof sheet 12 can also be reduced, thereby facilitating the lightweight of the secondary battery 100.

Figure 7:
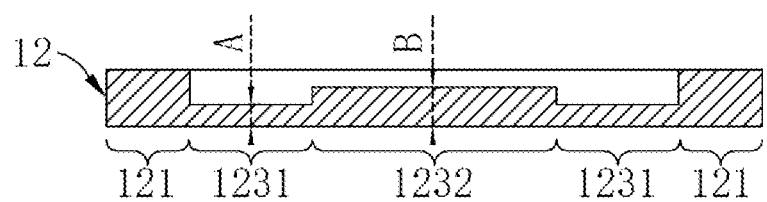
FIG. 7 is a sectional view at F-F in FIG. 6.

Referring to FIG. 6 and FIG. 7, the thickness of the connecting portion at the groove bottom of the weakened region 1231 is A, and the thickness of the connecting portion at the groove bottom of the strengthened region 1232 is B, $0.65 \leq A/B \leq 0.75$. Among them, when the pressure inside the secondary battery 100 reaches the threshold, the pressure release portion 122 is under pressure and deformed, and drives the weakened region 1231 being deformed to crack for pressure release, but the deformation of the pressure release portion 122 also brings deformation of the strengthened region 1232. The embodiment of the present application sets the ratio of the thickness of the connecting portion at the groove bottom of the weakened region 1231 to the thickness of the connecting portion at the groove bottom of the strengthened region 1232 to $0.65 \leq A/B \leq 0.75$, which can effectively avoid that when the pressure inside the secondary battery 100 reaches the threshold, the strengthened region 1232 also cracks.

Further, A/B can be 11:15. For example, the wall thickness A of the groove bottom of the weakened region 1231 is 0.11 mm, and the wall thickness B of the groove bottom of the strengthened region 1232 is 0.15 mm. Among them, the wall thickness A of the groove bottom of the weakened region 1231 is 0.11 mm, which can ensure that the secondary battery 100 has high structural strength during normal use and avoid cracking of the weakened region 1231 during normal use of the secondary battery 100, and can also ensure that when the pressure inside the secondary battery 100 reaches the threshold, the weakened region 1231 is cracked for pressure release. The wall thickness B of the groove bottom of the strengthened region 1232 is 0.15 mm, which can ensure that when the pressure inside the secondary battery 100 reaches the threshold the secondary battery 100 has high structural strength during normal use and avoid cracking of the strengthened region 1232 which causes the pressure release portion 122 being separated from the top cover 11 thereby causing danger to users when the pressure inside the secondary battery 100 reaches the threshold. And it can also ensure that when the pressure inside the secondary battery 100 is much greater than the threshold, the strengthened region 1232 may be cracked, and then the pressure release portion 122 can be separated from the top cover 11, so that the pressure inside the secondary battery 100 can be quickly released, and the explosion of the secondary battery 100 which causes greater danger to the user can be avoided.

Figure 8:
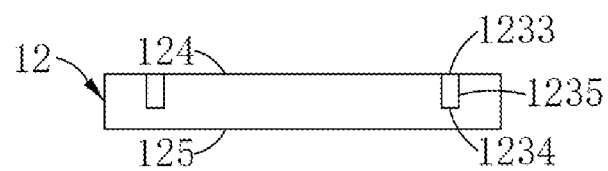
FIG. 8 is a sectional view at E-E in FIG. 6.
Figure 9:
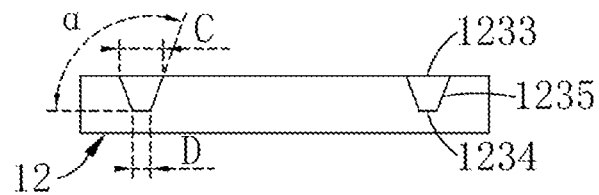
FIG. 9 is a schematic view of an annular groove of an explosion-proof sheet in FIG. 8 after improvement.

Referring to FIG. 6 and FIG. 8, the width of the notch 1233 of the annular groove can be equal to the width of the groove bottom 1234 of the annular groove. In another embodiment, referring to FIG. 6 and FIG. 9, the width of the notch 1233 of the annular groove can also be greater than the width of the groove bottom 1234 of the annular groove. That is, the cross-sectional shape of the annular groove is an inverted trapezoidal structure. The annular groove of the inverted trapezoidal structure is easy to be stamped and formed, and can avoid stress concentration between the groove bottom 1234 and the side wall 1235 of the annular groove, and prevent cracking at the junction of the side wall 1235 and the groove bottom 1234 in advance when the internal pressure of the battery does not reach the critical value, which affects the normal use of the battery.

Further, an angle α between the side wall 1235 of the annular groove and the groove bottom 1234 of the annular groove satisfies: $90° < \alpha \leq 120°$. When α is overly small, stress concentration may be formed between the side wall 1235 and the groove bottom 1234, and the junction of the side wall 1235 and the groove bottom 1234 is cracked in advance when the internal pressure of the battery does not reach the threshold, and the normal use of the battery is affected. When a is overly large, the depth of the annular groove may be small, so that when the internal pressure of the battery reaches a critical value, it cannot be exploded in time. Therefore, when the angle between the side wall 1235 of the annular groove and the groove bottom 1234 of the annular groove is 90°<α≤120°, not only the stress concentration between the side wall 1235 and the groove bottom 1234 can be avoided, but also the depth of the annular groove can be prevented from being small, so that the explosion-proof sheet 12 can perform the pressure release successfully.

Referring back to FIG. 5 and FIG. 6, the annular groove has a stadium-shaped structure. The stadium-shaped structure includes a straight groove 1236 and an arc-shaped groove 1237. The strengthened region 1232 is located at the straight groove 1236, and the weakened region is located at the arc-shaped groove 1237.

For example, there may be one or two strengthened regions 1232, and when there is one strengthened region 1232, the strengthened region 1232 is located at one of the straight grooves 1236.

When there are two strengthened regions 1232, as shown in FIG. 6, the two strengthened regions 1232 are respectively located at the two straight grooves 1236. Among them, a stadium-shape refers to a closed figure formed by bisecting a circle into two semi-circular arcs through the center of the circle and translating them in opposite directions, and connecting the endpoints of the two semi-circular arcs with two equal-length parallel lines. It can be seen that the annular groove of the stadium-shaped structure includes the straight groove 1236 and the arc-shaped groove 1237. In the embodiment of the present application, two strengthened regions 1232 are respectively arranged on the two straight grooves 1236, and two weakened regions 1231 are respectively arranged on the two arc-shaped grooves 1237. In this way, when the pressure inside the secondary battery 100 reaches the threshold, the weakened regions 1231 at the arc-shaped grooves 1237 located at both sides of the straight grooves 1236 will be cracked, and the strengthened regions 1232 on the straight grooves 1236 located between the two arc-shaped grooves 1237 will not be cracked. Therefore, vents can be formed on both sides of the straight groove 1236, and the gas in the secondary battery 100 can be discharged from two different vents, so that pressure concentration can be avoided during pressure release of the secondary battery 100, thereby increasing the efficiency of pressure release of the secondary battery 100 and improving the usage safety of the secondary battery 100.

In the above embodiment, as shown in FIG. 1, the top cover 11 is usually provided with a liquid injection hole 112. When the relative positions of the liquid injection hole 112 and the explosion-proof sheet 12 are set, the liquid injection hole 112 can be arranged to be close to the straight groove 1236 of the explosion-proof sheet 12. Therefore, when the pressure is released by the explosion-proof sheet 12, substance inside the battery may be ejected from the explosion-proof hole 111 along with the cracking of the explosion-proof sheet 12. Since the strengthened region 1232 is located at the straight groove 1236, a part of the pressure release portion 122 located at the straight groove 1236 is cracked, thereby preventing the substance inside the battery from entering the liquid injection hole 112 when the explosion-proof sheet 12 is cracked.

Referring to FIG. 1, FIG. 5 and FIG. 8, the explosion-proof sheet 12 has a front surface 124 and a back surface 125 arranged opposite to each other. The front surface 124 is a surface of the explosion-proof sheet 12 facing away from the interior of the secondary battery 100. The annular groove can be arranged on the front surface 124, and can also be arranged on the back surface 125, as long as it can be cracked when the internal pressure of the secondary battery 100 is greater than the threshold, and it is not specifically limited in the present application.

Preferably, in the embodiment of the present application, the annular groove is formed on the front surface 124 of the explosion-proof sheet 12. Wherein, after the fixing portion 121 of the explosion-proof sheet 12 is connected to the edge of the explosion-proof hole 111 on the top cover 11, when the internal pressure of the secondary battery 100 is greater than the threshold, the pressure release portion 122 is deformed in a direction away from the interior of the secondary battery 100 and drive the weakened region 1231 of the annular groove to be cracked. At this time, if the annular groove is formed on the back surface 125 of the explosion-proof sheet 12, the pressure release portion 122 deforms and drives the weakened region 1231 of the annular groove to be cracked. The side walls 1235 on both sides of the groove first approach each other and then separate, which causes the side walls 1235 on both sides of the annular groove to press against each other, and is not conducive to the cracking of the weakened region 1231 of the annular groove. In the embodiment of the present application, the annular groove is formed on the front surface 124 of the explosion-proof sheet 12, then when the pressure release portion 122 is deformed and drives the weakened region 1231 of the annular groove to be cracked, the side walls 1235 of the weakened region 1231 of the annular groove will be away from each other until they are separated, so as to facilitate the cracking of the weakened region 1231 of the annular groove for pressure release.

To sum up, in the present application, the explosion-proof sheet 12 includes the pressure release portion 122 and the fixing portion 121 arranged around the pressure release portion 122. The pressure release portion 122 and the fixing portion 121 are connected by the connecting portion 123, and the connecting portion 123 includes a weakened region 1231 and a strengthened region 1232. The wall thickness of the weakened region 1231 is smaller than the wall thickness of the strengthened region 1232. After the fixing portion 121 is connected to the edge of the explosion-proof hole 111 on the top cover 11, when the secondary battery 100 performs pressure release, the fixing portion 121 is still be connected to the edge of the explosion-proof hole 111, and the part where the pressure release portion 122 joins the weakened region 1231 is separated from the fixing portion 121 and the pressure is released. The part where the pressure release portion 122 joins the strengthened region 1232 may still remain connected, so as to prevent the explosion-proof sheet 12 from being separated from the top cover 11 as a whole when the pressure is released, thereby the usage safety of the secondary battery 100 is improved.

The explosion-proof sheet, the top cover assembly and the battery disclosed in the embodiments of the present application are described above in detail. The principle and implementations herein are described through exemplary examples. The description about the embodiments is merely provided to help understand the method and core ideas of the present application. In addition, persons of ordinary skill in the art can make modifications to the present application in terms of the exemplary implementations and application scopes based on the ideas of the present application. To sum up, the content of specification shall not be construed as a limit to the present application.

What is claimed is:

1. An explosion-proof sheet of a secondary battery, wherein the secondary battery comprises a top cover provided with an explosion-proof hole and the explosion-proof sheet is fitted on the top cover to close the explosion-proof hole, the explosion-proof sheet comprising:
   a pressure release portion arranged oppositely to the explosion-proof hole;
   a fixing portion surrounding the pressure release portion and connected to the top cover; and
   a connecting portion located between the pressure release portion and the fixing portion, and configured to connect the pressure release portion and the fixing portion;
   wherein a thickness of a part of the connecting portion is greater than a thickness of the remaining part of the connecting portion;
   the connecting portion comprises at least one strengthened region and at least one weakened region,
   a thickness of the strengthened region is greater than a thickness of the weakened region, and
   a length of the strengthened region on a surface of the explosion-proof sheet accounts for ⅙ to ⅓ of a total length of the connecting portion on the surface of the explosion-proof sheet;
   the connecting portion is an annular groove, and
   a thickness of the connecting portion at a groove bottom of the weakened region is smaller than a thickness of the connecting portion at a groove bottom of the strengthened region;
   a cross-sectional shape of the annular groove is an inverted trapezoidal structure, and
   an angle $\alpha$ between a side wall and the groove bottom of the annular groove satisfies: $90° < \alpha \leq 120°$.

2. The explosion-proof sheet of a secondary battery according to claim 1, wherein:
   the connecting portion has a thickness d1, the pressure release portion has a thickness d2, and the fixing portion has a thickness d3, wherein d1, d2 and d3 satisfy the relationship: $0.3 \leq d1/d2 \leq 0.4$, $0.5 \leq d2/d3 \leq 0.6$, and
   when an air pressure inside the secondary battery is greater than or equal to a threshold, the explosion-proof sheet is cracked in the connecting portion, and an air pressure P inside the secondary battery and the thickness d1 of the connecting portion satisfy the following relationship: $2.7 \leq P/d1 \leq 7.3$, wherein the unit of P is MPa, and the unit of d1 is millimeter.

3. The explosion-proof sheet of a secondary battery according to claim 2, wherein d1, d2, d3 and P satisfy the relationship: $d1:d2:d3 = 11:30:55$, and $P/d1 = 5.5$.

4. The explosion-proof sheet of a secondary battery according to claim 1, wherein:
   the thickness of the connecting portion at the groove bottom of the weakened region is A, and
   the thickness of the connecting portion at the groove bottom of the strengthened region is B,
   wherein A and B satisfy the following relationship: $0.65 \leq A/B \leq 0.75$.

5. The explosion-proof sheet of a secondary battery according to claim 4, wherein A and B satisfy the following relationship: $A/B = 11/15$.

6. The explosion-proof sheet of a secondary battery according to claim 1, wherein:
   the annular groove has a stadium-shaped structure, and
   the stadium-shaped structure comprises two straight grooves and two arc-shaped grooves, the two straight grooves are parallel to each other, and the two arc-shaped grooves are respectively connected to two ends of the two straight grooves,
   wherein the connecting portion comprises two strengthened regions, and the two strengthened regions are respectively located at the two straight grooves.

7. The explosion-proof sheet of a secondary battery according to claim 6, wherein:
   a liquid injection hole is further provided on the top cover, and
   the liquid injection hole is arranged to be close to the straight groove.

8. A top cover assembly comprising:
   a top cover provided with an explosion-proof hole; and,
   an explosion-proof sheet of a secondary battery, wherein the secondary battery comprises a top cover provided with an explosion-proof hole, the explosion-proof sheet is fitted on the top cover to close the explosion-proof hole, wherein the explosion-proof sheet comprises:
   a pressure release portion, arranged oppositely to the explosion-proof hole;
   a fixing portion surrounding the pressure release portion and connected to the top cover; and
   a connecting portion located between the pressure release portion and the fixing portion, and configured to connect the pressure release portion and the fixing portion;
   wherein a thickness of a part of the connecting portion is greater than a thickness of the remaining part of the connecting portion; and
   wherein a fixing portion of the explosion-proof sheet has a sealed connection with an edge of the explosion-proof hole;
   the connecting portion comprises at least one strengthened region and at least one weakened region,
   a thickness of the strengthened region is greater than a thickness of the weakened region, and
   a length of the strengthened region on a surface of the explosion-proof sheet accounts for ⅙ to ⅓ of a total length of the connecting portion on the surface of the explosion-proof sheet;
   the connecting portion is an annular groove, and
   a thickness of the connecting portion at a groove bottom of the weakened region is smaller than a thickness of the connecting portion at a groove bottom of the strengthened region;
   a cross-sectional shape of the annular groove is an inverted trapezoidal structure, and
   an angle $\alpha$ between a side wall and the groove bottom of the annular groove satisfies: $90° < \alpha \leq 120°$.

9. The top cover assembly according to claim 8, wherein:
   the connecting portion has a thickness d1, the pressure release portion has a thickness d2, and the fixing portion has a thickness d3, wherein d1, d2 and d3 satisfy the relationship: $0.3 \leq d1/d2 \leq 0.4$, $0.5 \leq d2/d3 \leq 0.6$, and
   when an air pressure inside the secondary battery is greater than or equal to a threshold, the explosion-proof sheet is cracked in the connecting portion, and an air pressure P inside the secondary battery and the thickness d1 of the connecting portion satisfy the following relationship: $2.7 \leq P/d1 \leq 7.3$, wherein the unit of P is MPa, and the unit of d1 is millimeter.

10. The top cover assembly according to claim 9, wherein d1, d2, d3 and P satisfy the relationship: $d1:d2:d3 = 11:30:55$, the $P/d1 = 5.5$.

11. The top cover assembly according to claim 8, wherein:
    the thickness of the connecting portion at the groove bottom of the weakened region is A, and the thickness of the connecting portion at the groove bottom of the strengthened region is B,
wherein A and B satisfy the following relationship: $0.65 \leq A/B \leq 0.75$.

12. The top cover assembly according to claim 11, wherein A and B satisfy the following relationship: $A/B=11/15$.

13. The top cover assembly according to claim 8, wherein:
the annular groove has a stadium-shaped structure, and
the stadium-shaped structure comprises two straight grooves and two arc-shaped grooves, the two straight grooves are parallel to each other, and the two arc-shaped grooves are respectively connected to two ends of the two straight grooves,
wherein the connecting portion comprises two strengthened regions, and the two strengthened regions are respectively located at the two straight grooves.

14. A secondary battery comprising a top cover assembly, wherein the top cover assembly comprises:
a top cover provided with an explosion-proof hole; and,
an explosion-proof sheet of a secondary battery, wherein the secondary battery comprises a top cover provided with an explosion-proof hole, the explosion-proof sheet is fitted on the top cover to close the explosion-proof hole, wherein the explosion-proof sheet comprises:
a pressure release portion arranged oppositely to the explosion-proof hole;
a fixing portion surrounding the pressure release portion and connected to the top cover; and
a connecting portion located between the pressure release portion and the fixing portion, and configured to connect the pressure release portion and the fixing portion;
wherein a thickness of a part of the connecting portion is greater than a thickness of the remaining part of the connecting portion; and
wherein a fixing portion of the explosion-proof sheet has a sealed connection with an edge of the explosion-proof hole;
the connecting portion comprises at least one strengthened region and at least one weakened region,
a thickness of the strengthened region is greater than a thickness of the weakened region, and
a length of the strengthened region on a surface of the explosion-proof sheet accounts for ⅙ to ⅓ of a total length of the connecting portion on the surface of the explosion-proof sheet;
the connecting portion is an annular groove, and
a thickness of the connecting portion at a groove bottom of the weakened region is smaller than a thickness of the connecting portion at a groove bottom of the strengthened region;
a cross-sectional shape of the annular groove is an inverted trapezoidal structure, and
an angle $\alpha$ between a side wall and the groove bottom of the annular groove satisfies: $90° < \alpha \leq 120°$.

\* \* \* \* \*